(12) United States Patent
Matsui et al.

(10) Patent No.: US 7,558,488 B2
(45) Date of Patent: *Jul. 7, 2009

(54) REACH EXTENSION BY USING EXTERNAL BRAGG GRATING FOR SPECTRAL FILTERING

(75) Inventors: Yasuhiro Matsui, Lawrence, MA (US); Parvis Tayebati, Weston, MA (US); Kevin McCallion, Charlestown, MA (US)

(73) Assignee: Finisar Corporation, Sunnyvale, CA (US)

( * ) Notice: Subject to any disclaimer, the term of this patent is extended or adjusted under 35 U.S.C. 154(b) by 643 days.

This patent is subject to a terminal disclaimer.

(21) Appl. No.: 11/093,461

(22) Filed: Mar. 30, 2005

(65) Prior Publication Data

US 2005/0271392 A1 Dec. 8, 2005

Related U.S. Application Data

(63) Continuation-in-part of application No. 11/068,032, filed on Feb. 28, 2005, and a continuation-in-part of application No. 11/015,686, filed on Dec. 17, 2004, and a continuation-in-part of application No. 11/015,591, filed on Dec. 17, 2004, now Pat. No. 7,280,721, and a continuation-in-part of application No. 11/016,466, filed on Dec. 17, 2004, and a continuation-in-part of application No. 11/016,020, filed on Dec. 17, 2004, and a continuation-in-part of application No. 10/680,607, filed on Oct. 6, 2003, now Pat. No. 7,054,538, and a continuation-in-part of application No. 10/308,522, filed on Dec. 3, 2002, and a continuation-in-part of application No. 10/289,944, filed on Nov. 6, 2002, now Pat. No. 6,963,685.

(60) Provisional application No. 60/557,538, filed on Mar. 30, 2004.

(51) Int. Cl.
*H04B 10/06* (2006.01)
(52) U.S. Cl. ...................................................... 398/201
(58) Field of Classification Search ................. 398/193, 398/194, 199, 201
See application file for complete search history.

(56) References Cited

U.S. PATENT DOCUMENTS 3,324,295 A 6/1967 Harris (Continued)

FOREIGN PATENT DOCUMENTS

GB 2107147 4/1983

(Continued)

OTHER PUBLICATIONS

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

(Continued)

*Primary Examiner*—Leslie Pascal
(74) *Attorney, Agent, or Firm*—Workman Nydegger

(57) ABSTRACT

A fiber optic system comprising a modulated signal source coupled to a spectral filtering element characterized in that the bandwidth of the optical spectrum of the signal after the spectral filtering element is reduced relative to the optical bandwidth of the spectrum before the filtering element.

7 Claims, 15 Drawing Sheets

Modification of preferred embodiment shown in fig. 3. FBG 2 is packaged in the same box as FBG 1 with TEC.

U.S. PATENT DOCUMENTS

| | | | |
|---|---|---|---|
| 3,999,105 | A | 12/1976 | Archey et al. |
| 4,038,600 | A | 7/1977 | Thomas et al. |
| 4,561,119 | A | 12/1985 | Epworth |
| 4,805,235 | A | 2/1989 | Henmi |
| 4,841,519 | A | 6/1989 | Nishio |
| 5,293,545 | A | 3/1994 | Huber |
| 5,325,378 | A | 6/1994 | Zorabedian |
| 5,371,625 | A | 12/1994 | Wedding et al. |
| 5,412,474 | A | 5/1995 | Reasenberg et al. |
| 5,416,629 | A | 5/1995 | Huber |
| 5,465,264 | A | 11/1995 | Buhler et al. |
| 5,477,368 | A | 12/1995 | Eskildsen et al. |
| 5,550,667 | A | 8/1996 | Krimmel et al. |
| 5,592,327 | A * | 1/1997 | Gabl et al. .................. 359/348 |
| 5,737,104 | A | 4/1998 | Lee et al. |
| 5,777,773 | A | 7/1998 | Epworth et al. |
| 5,805,235 | A | 9/1998 | Bedard |
| 5,856,980 | A | 1/1999 | Doyle et al. |
| 5,920,416 | A | 7/1999 | Beylat et al. |
| 5,953,139 | A | 9/1999 | Nemecek et al. |
| 5,974,209 | A | 10/1999 | Cho et al. |
| 6,081,361 | A | 6/2000 | Adams et al. |
| 6,096,496 | A | 8/2000 | Frankel |
| 6,104,851 | A | 8/2000 | Mahgerefteh |
| 6,115,403 | A | 9/2000 | Brenner et al. |
| 6,222,861 | B1 | 4/2001 | Kuo et al. |
| 6,271,959 | B1 | 8/2001 | Kim et al. |
| 6,298,186 | B1 | 10/2001 | He |
| 6,331,991 | B1 | 12/2001 | Mahgerefteh |
| 6,359,716 | B1 | 3/2002 | Taylor |
| 6,473,214 | B1 | 10/2002 | Roberts et al. |
| 6,506,342 | B1 | 1/2003 | Frankel |
| 6,563,623 | B1 | 5/2003 | Penninckx et al. |
| 6,577,013 | B1 | 6/2003 | Glenn et al. |
| 6,618,513 | B2 | 9/2003 | Evankow, Jr. |
| 6,654,564 | B1 | 11/2003 | Colbourne et al. |
| 6,665,351 | B2 | 12/2003 | Hedberg et al. |
| 6,687,278 | B1 * | 2/2004 | Mason et al. ............ 372/50.22 |
| 6,748,133 | B2 | 6/2004 | Liu et al. |
| 6,778,307 | B2 | 8/2004 | Clark |
| 6,810,047 | B2 | 10/2004 | Oh et al. |
| 6,834,134 | B2 * | 12/2004 | Brennan et al. ............... 385/15 |
| 6,836,487 | B1 | 12/2004 | Farmer et al. |
| 6,847,758 | B1 | 1/2005 | Watanabe |
| 6,947,206 | B2 | 9/2005 | Tsadka et al. |
| 6,963,685 | B2 | 11/2005 | Mahgerefteh et al. |
| 7,013,090 | B2 | 3/2006 | Adachi et al. |
| 7,054,538 | B2 | 5/2006 | Mahgerefteh et al. |
| 7,076,170 | B2 | 7/2006 | Choa |
| 7,123,846 | B2 | 10/2006 | Tateyama et al. |
| 7,263,291 | B2 | 8/2007 | Mahgerefteh et al. |
| 7,280,721 | B2 | 10/2007 | McCallion et al. |
| 2002/0154372 | A1 | 10/2002 | Chung et al. |
| 2002/0159490 | A1 | 10/2002 | Karwacki |
| 2002/0176659 | A1 | 11/2002 | Lei et al. |
| 2003/0002120 | A1 * | 1/2003 | Choa .......................... 359/182 |
| 2003/0067952 | A1 | 4/2003 | Tsukiji et al. |
| 2003/0099018 | A1 | 5/2003 | Singh et al. |
| 2003/0147114 | A1 | 8/2003 | Kang et al. |
| 2003/0193974 | A1 | 10/2003 | Frankel et al. |
| 2004/0008933 | A1 | 1/2004 | Mahgerefteh et al. |
| 2004/0008937 | A1 | 1/2004 | Mahgerefteh et al. |
| 2004/0036943 | A1 | 2/2004 | Freund et al. |
| 2004/0076199 | A1 | 4/2004 | Wipiejewski et al. |
| 2004/0096221 | A1 | 5/2004 | Mahgerefteh et al. |
| 2004/0218890 | A1 | 11/2004 | Mahgerefteh et al. |
| 2005/0100345 | A1 | 5/2005 | Welch et al. |
| 2005/0111852 | A1 | 5/2005 | Mahgerefteh et al. |
| 2005/0175356 | A1 | 8/2005 | McCallion et al. |
| 2005/0206989 | A1 | 9/2005 | Marsh |
| 2005/0271394 | A1 * | 12/2005 | Whiteaway et al. ......... 398/188 |
| 2005/0286829 | A1 | 12/2005 | Mahgerefteh et al. |
| 2006/0002718 | A1 | 1/2006 | Matsui et al. |
| 2006/0018666 | A1 | 1/2006 | Matsui et al. |
| 2006/0029358 | A1 | 2/2006 | Mahgerefteh et al. |
| 2006/0029396 | A1 | 2/2006 | Mahgerefteh et al. |
| 2006/0029397 | A1 | 2/2006 | Mahgerefteh et al. |
| 2006/0228120 | A9 | 10/2006 | McCallion et al. |
| 2006/0233556 | A1 | 10/2006 | Mahgerefteh et al. |
| 2006/0274993 | A1 | 12/2006 | Mahgerefteh et al. |

FOREIGN PATENT DOCUMENTS

| | | |
|---|---|---|
| WO | 9905804 | 2/1999 |
| WO | 0104999 | 1/2001 |
| WO | 03005512 | 7/2002 |

OTHER PUBLICATIONS

Corvini, P.J. et al., Computer Simulation of High-Bit-Rate Optical Fiber Transmission Using Single-Frequency Lasers, Journal of Lightwave Technology, Nov. 1987, 1591-1595, vol. LT-5, No. 11.

Brent E. Little, Advances in MicroRing Resonators, Integrated Photonics Research Conference 2003.

Hamutal Shalom et al., On the Various Time Constants of Wavelength Changes of a DFB Laser Under Direct Modulation, IEEE Journal of Quantum Electronics, Oct. 1998, pp. 1816-1822, vol. 34, No. 10.

Yuan P. Li. et al., Chapter 8: Silicon Optical Bench Waveguide Technology, Optical Fiber Communications, 1997, 319-370, vol. IIIB, Lucent Technologies, New York.

Koch, T.L. et al., Nature of Wavelength Chirping in Directly Modulated Semiconductor Lasers, Electronics Letters, Dec. 6, 1984, 1038-1039, vol. 20, No. 25/26.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Kurtzke, C. et al., Impact of Residual Amplitude Modulation on the Performance of Dispersion-Supported and Dispersion-Mediated Nonlinearity-Enhanced Transmission, Electronics Letters, Jun. 9, 1994, 988-990, vol. 30, No. 12.

Rasmussen, C.J. et al., Optimum Amplitude- and Frequency-Modulation in an Optical Communication System Based on Dispersion Supported Transmission, Electronics Letters, Apr. 27, 1995, 746-747, vol. 31, No. 9.

Wedding, B., Analysis of Fibre Transfer Function and Determination of Receiver Frequency Response for Dispersion Supported Transmission, Electronics Letters, Jan. 6, 1994, 58-59, vol. 30, No. 1.

Hyryniewicz, J.V. et al., Higher Order Filter Response in Coupled MicroRing Resonators, IEEE Photonics Technology Letters, Mar. 2000, 320-322, vol. 12, No. 3.

Yu et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Alexander et al., Passive Equalization of Semiconductor Diode Laser Frequency Modulation, Journal of Lightwave Technology, Jan. 1989, 11-23, vol. 7, No. 1.

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Matsui, Yasuhiro et al, Chirp-Managed Directly Modulated Laser (CML), IEEE Photonics Technolgy Letters, Jan. 15, 2006, pp. 385-387, vol. 18, No. 2.

Nakahara, K. et al, 40-Gb/s Direct Modulation With High Extinction Ratio Operation of 1.3-µm InGaAl As Multiquantum Well Ridge Waveguide Distributed Feedback Lasers, IEEE Photonics Technology Leters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

* cited by examiner

Fig. 1 The black curve on the top shows instantaneous frequency as function of time where transient chirps (negative going cusp in leading edge and top notch in the trailing edge) is applied to obtain the eye opening after transmission in a fiber with a dispersion of +1600 ps/nm.

Fig. 2 External cavity laser using FBG as external mirror.

Fig. 3 External cavity laser using FBG as an external mirror and second FBG for spectral shaping.

Fig. 4 Spectrum of modulated signal at 10 Gb/s with adiabatic chirp (red). Green curve shows the transmission spectrum of band pass filter. The yellow curve shows the spectrum after the passage through the filter.

Fig. 5 Modification of preferred embodiment shown in fig. 3. FBG 2 is packaged in the same box as FBG 1 with TEC.

BB and 140-km transmission performance with/without filter

There is no offset frequency between filter and signal. The optimum 3-dB BW of filter is 14 GHz. So, the improvement by 1.2 dB stems from bandwidth limitation rather than VSB effect.

BB and 140-km eye without filter

The performance degraded under poor OSNR and with jitter from DML laser for RIO.

OSNR penalty for 1E-12 was 4.0 dB.
BB OSNR: 19.17 dB
140km OSNR: 23.18 dB

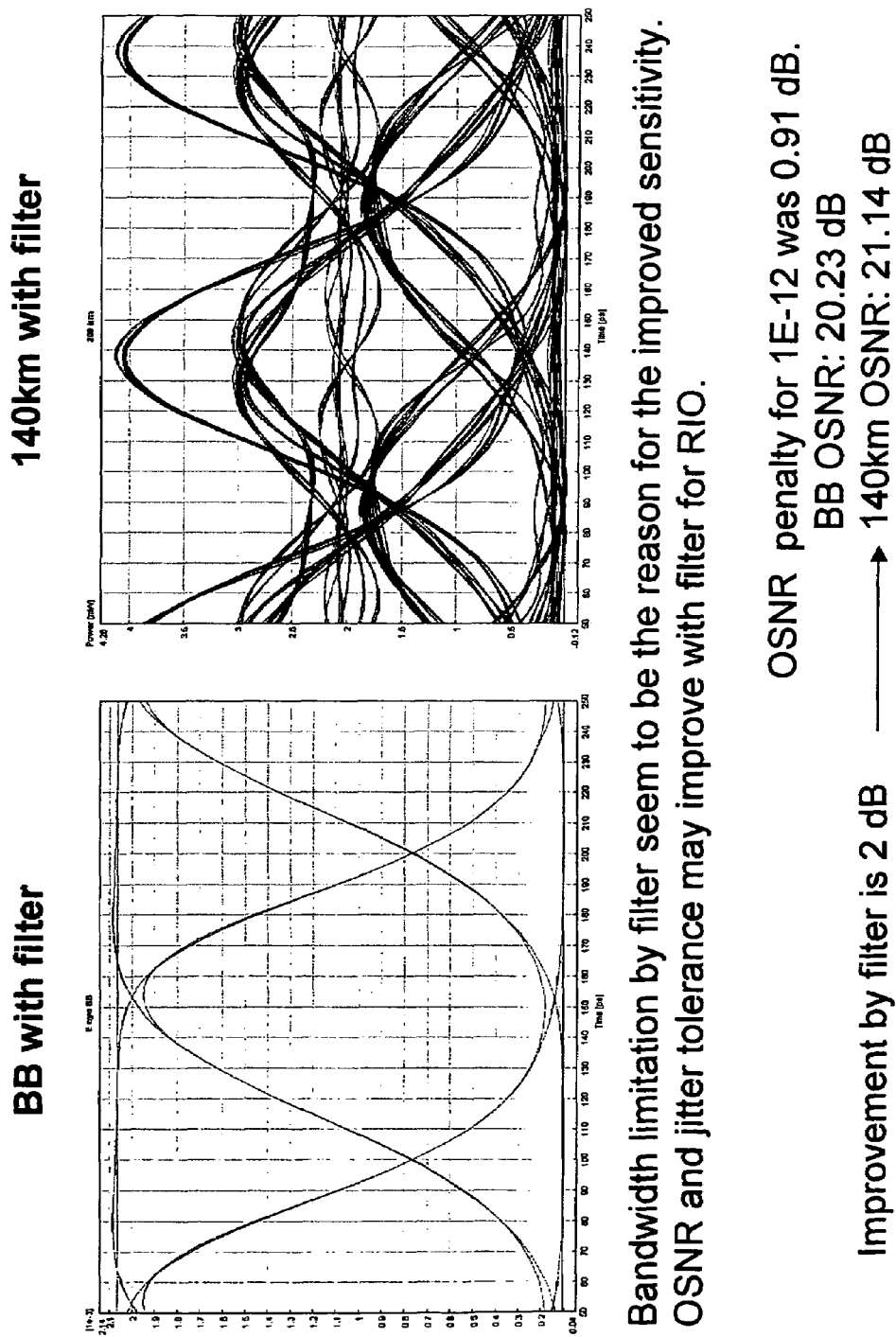
Figure 8 BB and 140-km eye with filter

Figure 9  Optical spectrum before and after OBPF
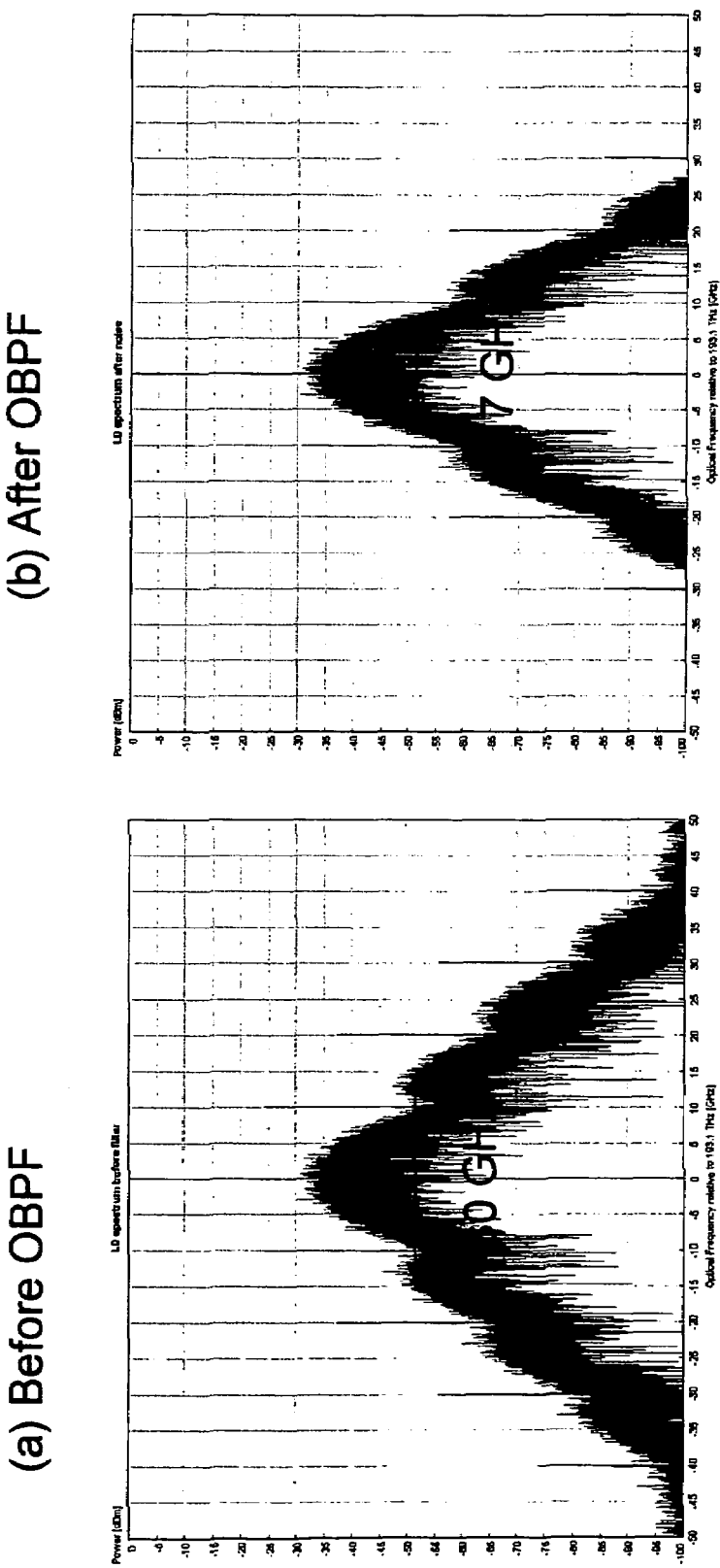
(a) Before OBPF
(b) After OBPF Figure 10    Chirp waveform before and after OBPF
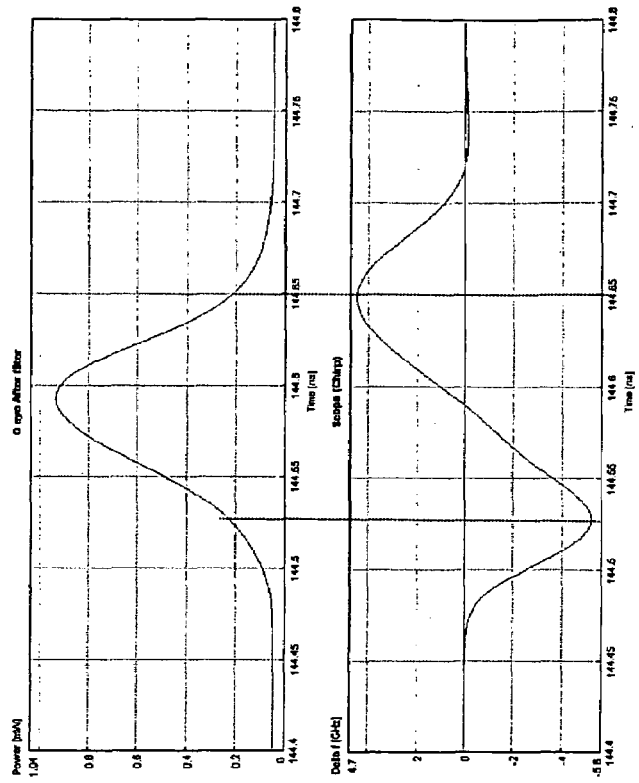
(a) Before OBPF
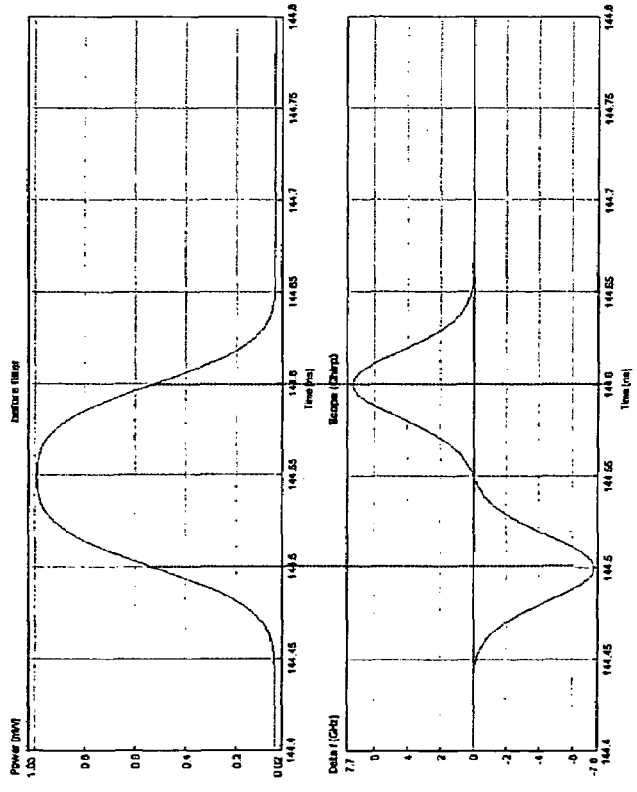
(b) After OBPF Figure 11
Waveforms before and after transmission without OBPF
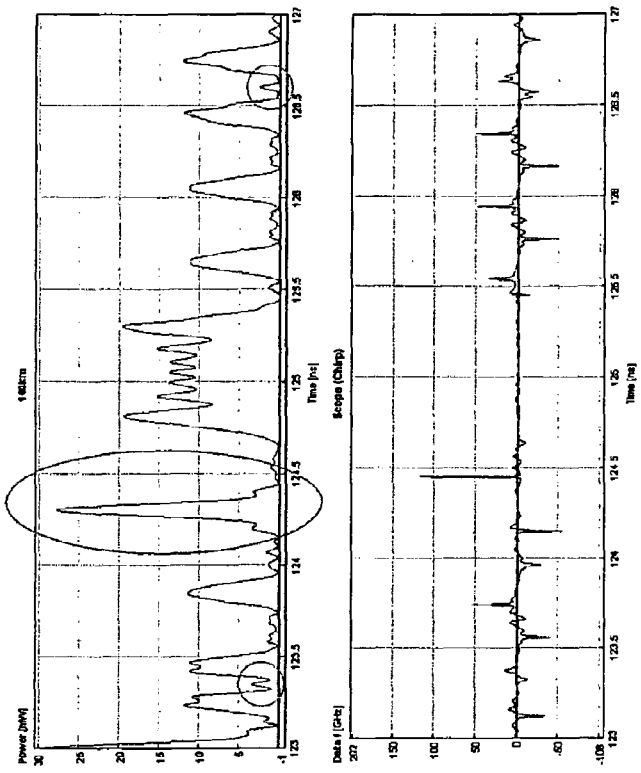
(b) After 140 km transmission
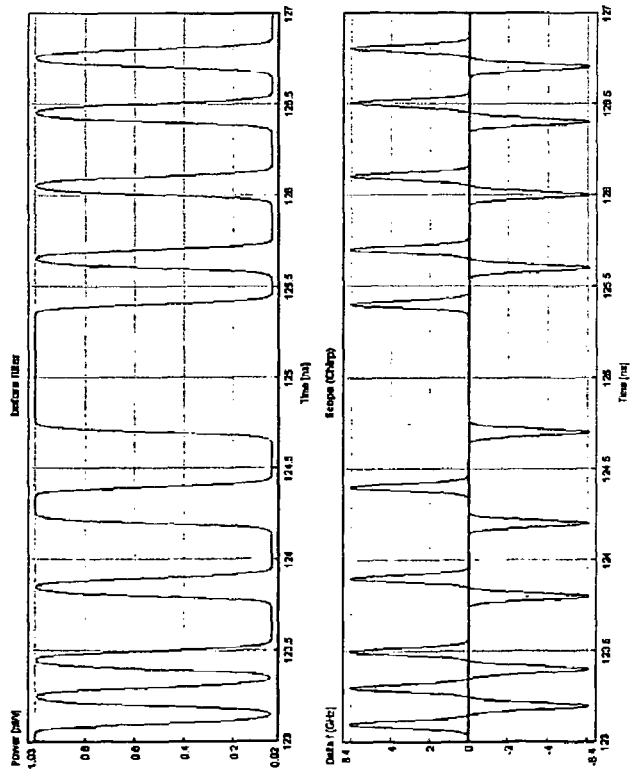
(a) BB Figure 12
Waveforms before and after transmission with OBPF
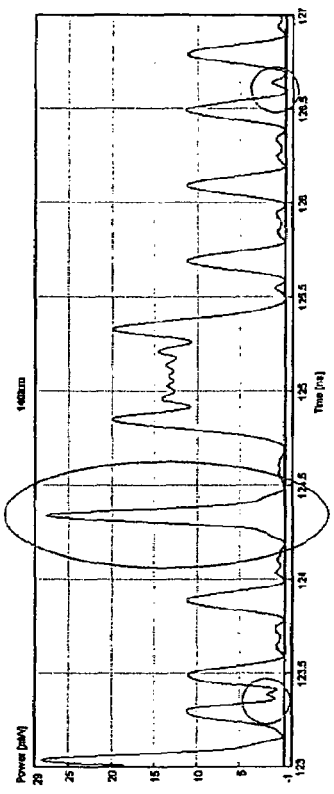
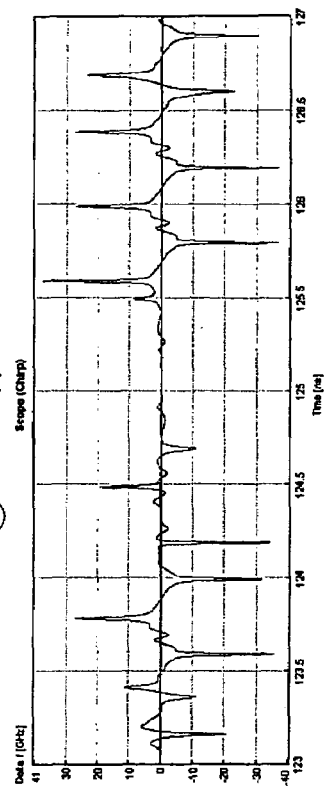
(b) After 140 km transmission
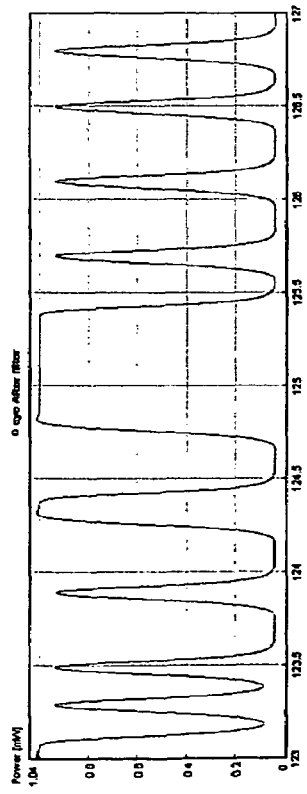
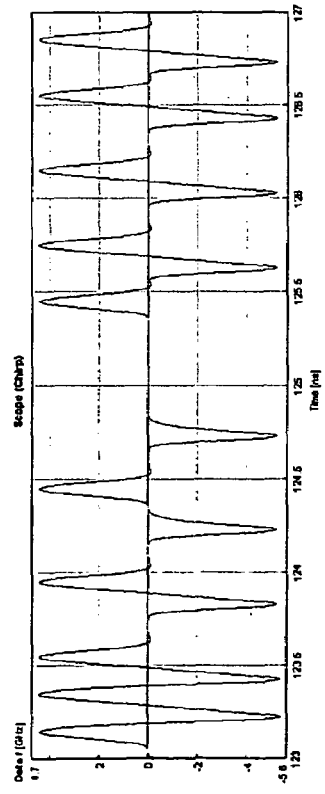
(a) BB Effect of frequency offset between filter and signal The best result was obtained with zero frequency offset. VSB effect was not observed.

Figure 14
Effect of duty cycle
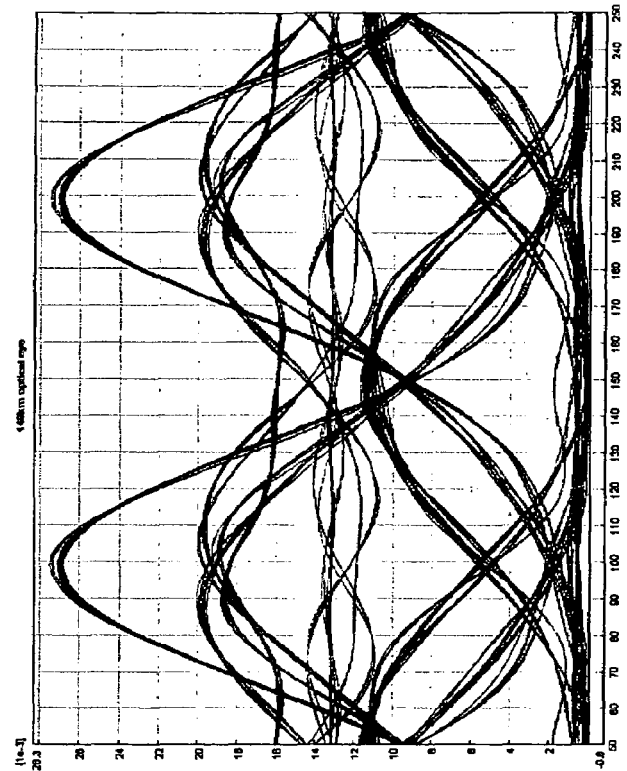
(b) Duty = 50%
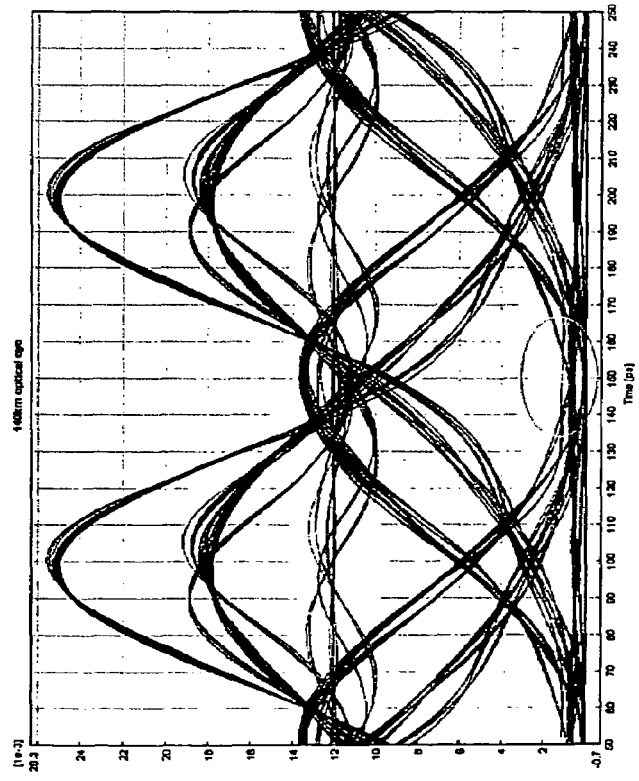
(a) Duty = 60%

REACH EXTENSION BY USING EXTERNAL BRAGG GRATING FOR SPECTRAL FILTERING

REFERENCE TO PENDING PRIOR PATENT APPLICATIONS

This patent application:

(i) is a continuation-in-part of prior U.S. patent application Ser. No. 10/289,944, filed Nov. 6, 2002 now U.S. Pat. No. 6,963,685 by Daniel Mahgerefteh et al. for POWER SOURCE FOR A DISPERSION COMPENSATION FIBER OPTIC SYSTEM;

(ii) is a continuation-in-part of pending prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of prior U.S. patent application Ser. No. 10/680,607, filed Oct. 6, 2003 now U.S. Pat No. 7,054,538 by Daniel Mahgerefteh et al. for FLAT DISPERSION FREQUENCY DISCRIMINATOR (FDFD);

(iv) is a continuation-in-part of pending prior U.S. patent application Ser. No. 11/016,020, filed Dec. 17, 2004 by Parviz Tayebati et al. for CHIRPED MANAGED, WAVELENGTH MULTIPLEXED, DIRECTLY MODULATED SOURCES USING AN ARRAYED WAVEGUIDE GRATING (AWG) AS MULTI-WAVELENGTH DISCRIMINATOR;

(v) is a continuation-in-part of pending prior U.S. patent application Ser. No. 11/016,466, filed Dec. 17, 2004 by Daniel Mahgerefteh et al. for CHIRPED MANAGED LASER WITH ELECTRONIC PRE-DISTORTION;

(vi) is a continuation-in-part of prior U.S. patent application Ser. No. 11/015,591, filed Dec. 17, 2004 now U.S. Pat. No. 7,280,721 by Kevin McCallion et al. for MULTI-RING RESONATOR IMPLEMENTATION OF OPTICAL SPECTRUM RESHAPER FOR CHIRP MANAGED LASER TECHNOLOGY;

(vi) is a continuation-in-part of pending prior U.S. patent application Ser. No. 11/015,686, filed Dec. 17, 2004 by Parviz Tayebati et al. for CHIRP MANAGED LASER FIBER OPTIC SYSTEM INCLUDING AN ADAPTIVE RECEIVER;

(vii) is a continuation-in-part of pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT; and (viii) claims benefit of pending prior U.S. Provisional Patent Application Ser. No. 60/557,538, filed Mar. 30, 2004 by Yasuhiro Matsui et al. for REACH EXTENSION BY USING EXTERNAL FIBER BRAGG GRATING FOR SPECTRAL FILTERING;

The eight above-identified patent applications are hereby incorporated herein by reference.

FIELD OF INVENTION

This invention generally relates to laser diodes used as an optical transmitter for a fiber optic system by direct modulation.

BACKGROUND OF THE INVENTION

The quality and performance of a digital transmitter is determined by the distance over which the transmitted digital signal can propagate without severe distortions. This is typically characterized as the distance over which a dispersion penalty reaches a level of ~1 dB. A standard 10 Gb/s optical digital transmitter, such as an externally modulated source, can transmit up to a distance of ~50 km in standard single mode fiber at 1550 nm before the dispersion penalty reaches the level of ~1 dB. This distance is typically called the dispersion limit. The dispersion limit is determined by the fundamental assumption that the digital signal is transform-limited, i.e., the signal has no time-varying phase across its bits and the signal has a bit period of 100 ps, or 1/(bit rate) for a 10 Gb/s optical digital transmitter.

High speed optically modulated digital signals are composed of pulses of different width. These pulses distort after propagation in a dispersive fiber because they typically have a wide frequency content. Since these constituting frequencies propagate at different speeds in the fiber, they become of out phase and cause the pulses to distort. Use of signals with narrowed spectrum can therefore help reduce the distortion caused by fiber dispersion since the degree of difference in propagation speed within the signal spectrum (i.e dispersion) is in proportion to the spectral width of the modulated signal.

Another technique to overcome the dispersion limit of fiber transmission is addition of transient chirp to the signal. Transient chirps is an increase or decrease in the frequency of the carrier, which occurs at the rising and falling edges of the digital signal in a time much shorter than the bit period. A red frequency shift on rising edge and a blue frequency shift on falling edge, typically called negative chirp, improves the transmission of NRZ signal over standard single mode fiber (SSMF) with positive dispersion. Such transient chirp can be generated by electro-absorption (EA) external modulator with high negative DC bias or small detuning of bandgap of the absorbing layer from incident wavelength. An externally $LiNbO_3$ modulated signal can be also used to generate transient chirp. The example of this pre-chirping technique is shown in FIG. 1 where electro-absorption modulator (EAM) is used for cording as an example. It is well-known that signal generated by EAM is accompanied by transient chirp as shown in FIG. 1. In the example shown in FIG. 1, the leading edge of the pulse shows the sharp increase in the instantaneous frequency (red chirp) and the trailing edge of the pulse shows the sharp decrease in the instantaneous frequency (blue chirp). In an anomalous dispersion fiber, the blue chirp component propagate faster than red chirp component, therefore, the pulse compresses rather and disperses after fiber transmission (+1600 ps/nm shown on the left).

Transient chirp can also be obtained by forming an external cavity laser consisting of semiconductor optical amplifier (SOA) chip to provide gain and an external fiber Bragg grating (FBG) to form the laser cavity (FIG. 2). The facet reflectivity at the end of SOA facing the FBG is antireflection coated to suppress the lasing within the SOA facets. Lasing in a single mode is possible by using FBG whose reflection bandwidth is narrower than the mode spacing, which is inturn determined by the cavity length. The laser output is modulated with digital data by by directly modulating the injection current into the semiconductor gain section. A variety of gratings can be used instead of the FBG such as a waveguide grating made in Si or Silica, or other planar light wave circuit (PLC) material.

SUMMARY OF THE INVENTION

In the preferred embodiment of the present invention, the reach of a digital signal is extended beyond the dispersion limit by adding an optical band pass filter after the transmitter to restrict the optical bandwidth of the modulated signal. The center frequency of the optical band pass filter (OBPF) maybe aligned with or slightly shifted relative to the center of the modulated signal spectrum.

In another embodiment of the present invention, the transmission performance of an FBG external cavity laser, shown in FIG. 2, is increased by narrowing its output spectrum by bandpass filtering.

It is another feature of the present invention to provide optimum combination of chirp characteristics and filtering characteristics.

It is another embodiment of the present invention to extend the reach of the external cavity laser by adding a filter to remove part of the output spectrum of the laser, here called vestigial side band filtering.

The invention provides a solution to mitigate the fiber dispersion limitation. In one embodiment of the present invention a second grating (e.g. an FBG) is placed after the isolator in FIG. 2 in order to reduce the spectral intensity for only half of the whole spectrum shape. A modulated spectrum with double-sided band contains redundant information on each side band. Removal of one of the side bands, which is referred to as vestigial side band (VSB) effect [1], may improve the quality of transmission. In one embodiment of the present invention a compact and simple implementation is provided for reach extension by using a filter for VSB signal filtering.

A method for transmission beyond the dispersion limit was provided in which a frequency modulated source is flowed by an optical filter, sometimes also called an optical spectrum reshaper as described in U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM; and U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT. This transmitter is called a Chirp Managed laser (CML™) by Azna LLC of Wilmington Mass. A variety of frequency modulated (FM) sources where described. It is an embodiment of the present invention that the FM source be an external cavity laser (ECL). The ECL may comprise a waveguide Bragg grating or a fiber Bragg grating.

By generating a signal with adiabatic chirp from an external cavity laser followed by an optical filter or optical spectrum reshaper, it is possible to further benefit the filtering effects as described in the followings section.

BRIEF DESCRIPTION OF THE DRAWINGS

FIG. 8 illustrates eye diagrams for an optical transmitter including a filter in accordance with an embodiment of the present invention.

FIG. 9 illustrates the optical spectrum of an optical transmitter before and after an optical band-pass filter in accordance with an embodiment of the present invention.

FIG. 10 illustrates the chirp waveform of an optical transmitter before and after an optical band-pass filter in accordance with an embodiment of the present invention.

FIG. 11 illustrates waveforms of signals from an optical transmitter both before and after transmission without the use of an optical band-pass filter in accordance with an embodiment of the present invention.

FIG. 12 illustrates waveforms of signals from an optical transmitter both before and after transmission with the use of an optical band-pass filter in accordance with an embodiment of the present invention.

FIG. 14 illustrate eye diagrams for optical signals having differing duty cycles in accordance with an embodiment of the present invention.

DETAILED DESCRIPTION OF THE PREFERRED EMBODIMENTS

Figure 1:
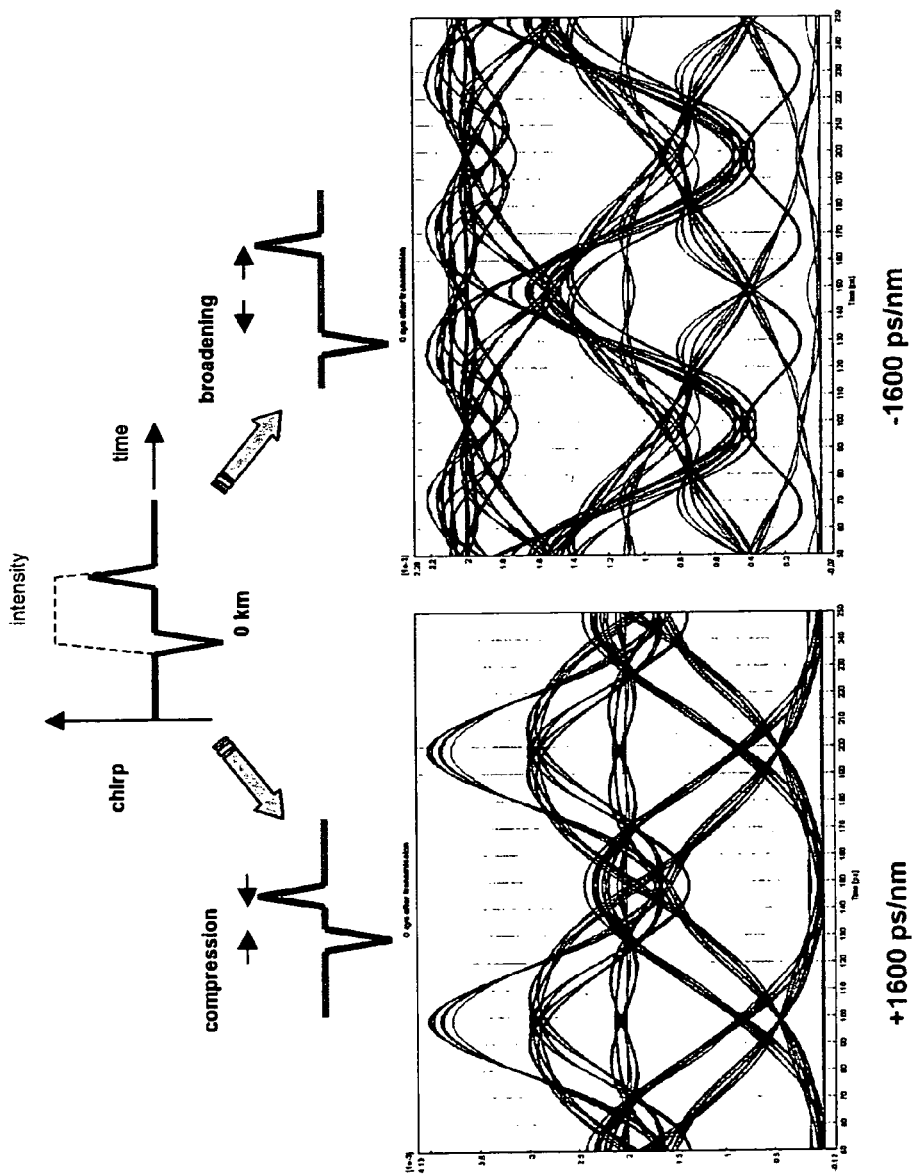
FIG. 1 illustrates eye diagrams for signals generated using an electro-absorption modulator.
Figure 2:
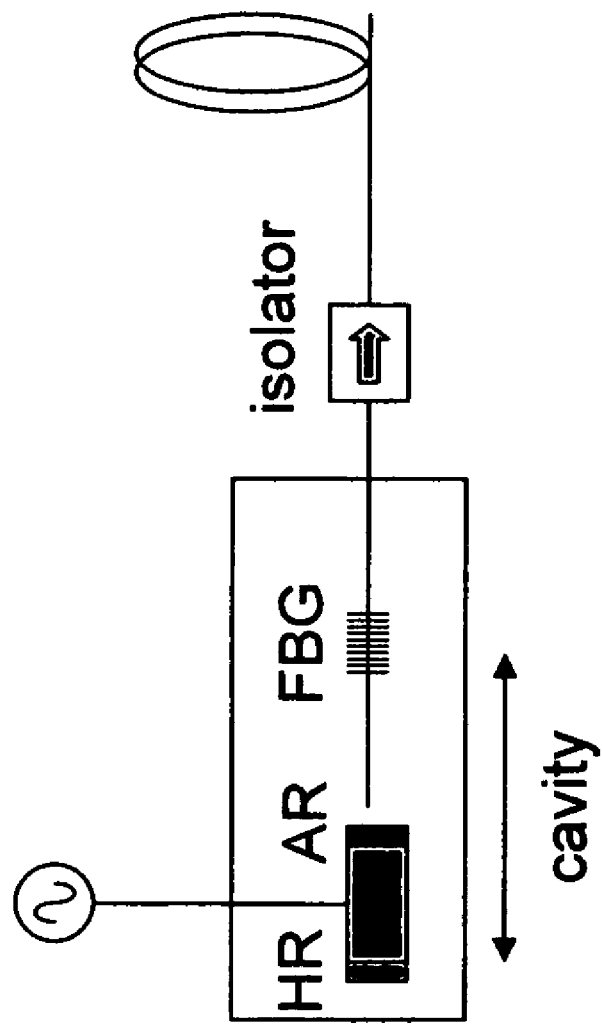
FIG. 2 illustrates an external cavity laser using a fiber Bragg grating as an external mirror.
Figure 3:
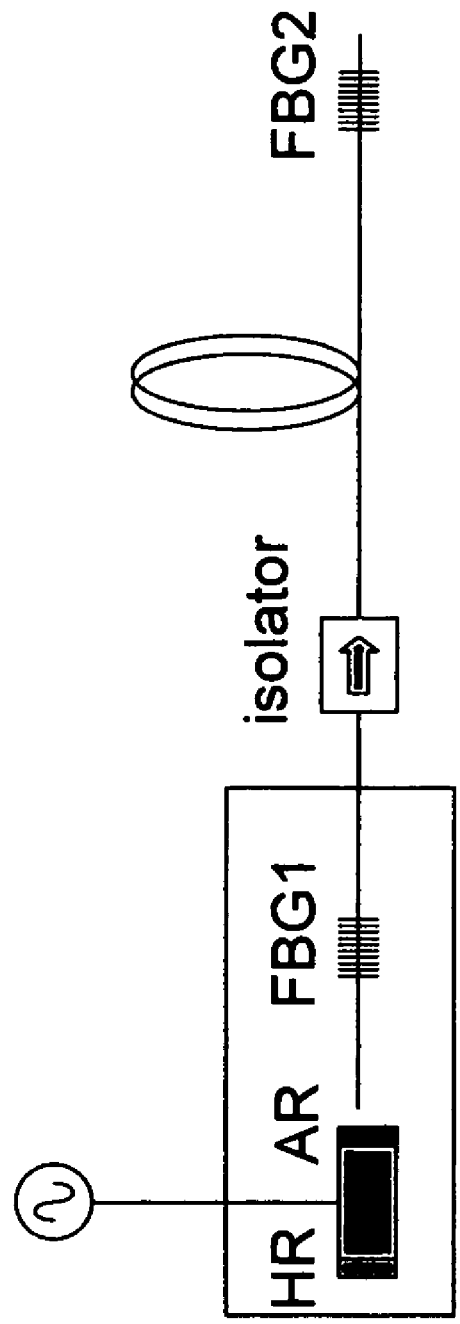
FIG. 3 illustrates an external cavity laser using a first fiber Bragg grating as an external mirror and a second fiber Bragg grating for spectral shaping in accordance with an embodiment of the present invention.

FIG. 3 shows the preferred embodiments of the invention. FBG 1 is used to form external cavity together with semiconductor laser chips with AR coating on the front facet. After the isolator, FBG 2 is used to filtering the coded signal in the spectral domain. The modulated signal is assumed to be either un-chirped or to contain transient chirp. By spectral filtering, VSB effect is expected to extend the reach. The generation of VSB signal is possible, for example, by using an optical filter where the center frequency of the modulated signal is located on the edge of transmission spectrum of the filter. The slope of transmission for the filer is controlled by the detuning between the center frequencies for modulated signal and transmission spectrum of filter. By using higher slope in the transmission spectrum of the filer, VSB effect is enhanced. In this case, one of the side bands experiences larger loss due to the transmission slope of the filter than the other side of the side band of the signal does. Removal of redundant energy and narrowed spectrum leads to the improvement in the received sensitivity after the transmission due to suppressed dispersion effect in the fiber.

In order to generate VSB signal by using band-pass filters, the center frequency of the transmission spectra for the filter can be detuned from the center of the spectrum for the modulated signal. When the amount of detuning coincides with around the half of the FWHM of the band-pass filter, there is net slope of transmission for the filter, and this offset can be used to preferentially suppress one of the side band over the other. For example, in order to generate VSB signal at 10 Gb/s NRZ or RZ signals, the FHHM of the band pass filter can be 5 GHz-20 GHz, the corresponding detuning can be 5 GHz-20 GHz, respectively.

In order to generate VSB signal by using edge filters, the center frequency of the modulated signal can be tuned to coincide with the edge of the filter.

Figure 4:
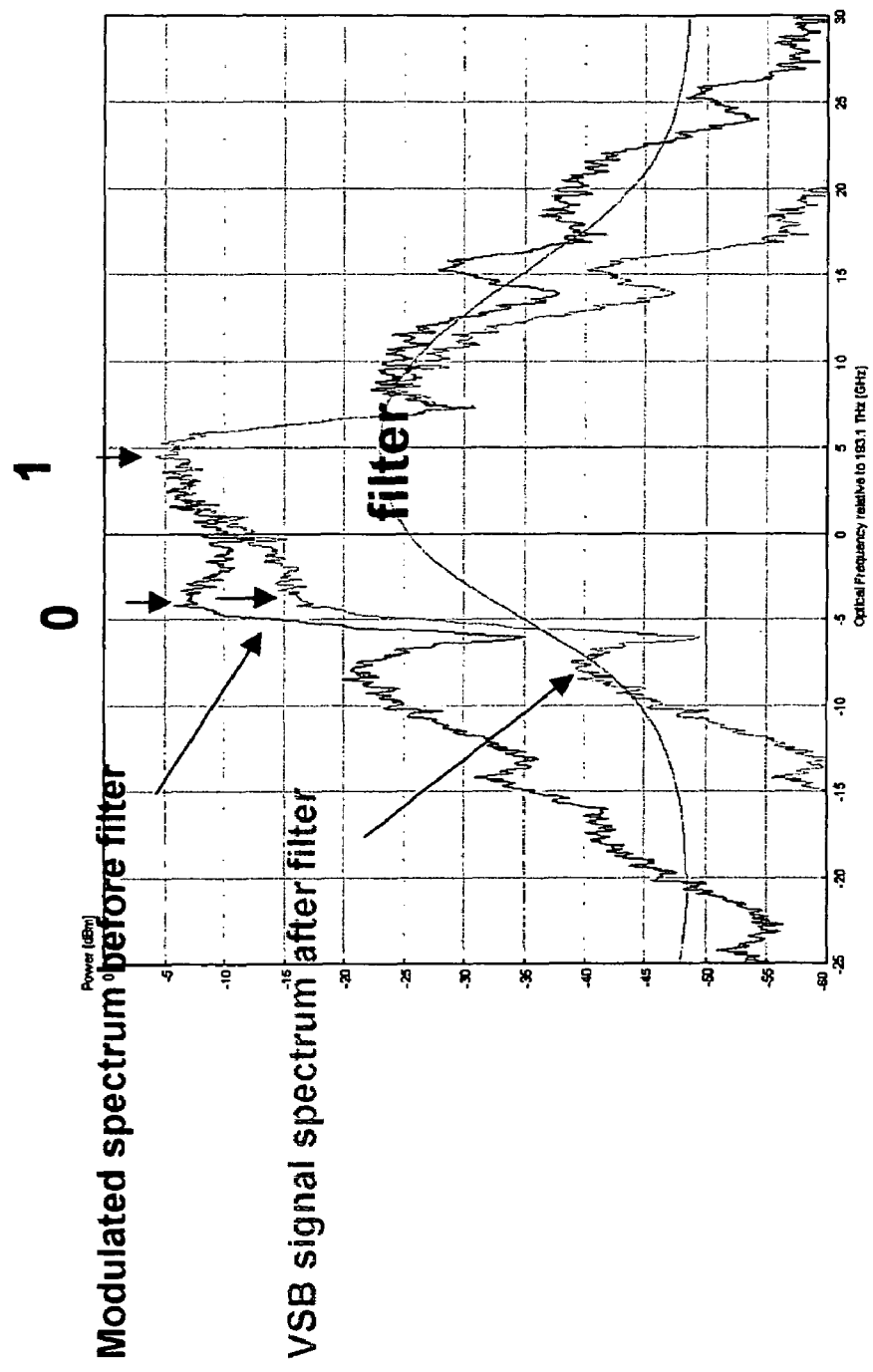
FIG. 4 illustrates a spectrum of a modulated signal before and after filtering in accordance with an embodiment of the present invention.

In the above examples, either un-chirped or transient chirped signal were discussed. When the modulated signal has adiabatic chirp, then, further improvement in the transmission distance is expected. The detail of the principle is described and filed in U.S. patent application Ser. No. 10/289, 944, filed Nov. 6, 2002 by Daniel Mahgerefteh et al. for POWER SOURCE FOR A DISPERSION COMPENSATION FIBER OPTIC SYSTEM; and U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT. As shown in FIG. 4, the modulated signal with adiabatic chirp shows two peaks corresponding to the signal for 1's and 0's. The separation of there two peaks in frequency corresponds to the amount of adiabatic chirp for 1's and 0's. One of advantages for this scheme is that the extinction ratio is enhanced due to the removal of spectral energy for 0's. The sensitivity at the receiver is improved accordingly. Also, the lower frequency side of the side bands is removed, leading to the suppressed distortion due to fiber dispersion.

MODIFICATIONS OF THE PREFERRED EMBODIMENTS

Figure 5:
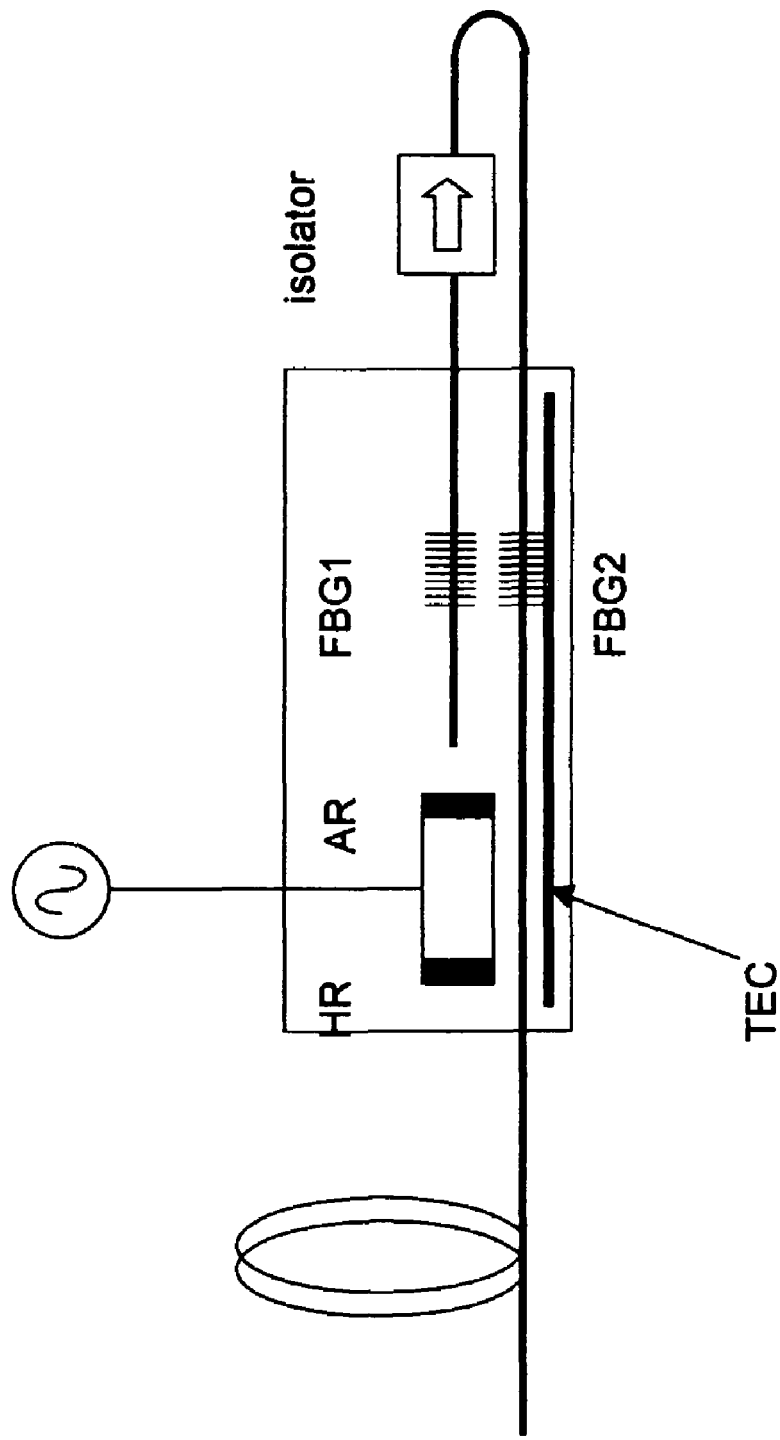
FIG. 5 illustrates an alternative embodiment of an external cavity laser using a first fiber Bragg grating as an external mirror and a second fiber Bragg grating for spectral shaping in accordance with an embodiment of the present invention.

In FIG. 3, the FBG 2 is located outside of the package module. Any temperature fluctuation in FBG 2 is translated into power fluctuation in the transmitted power after the FBG 2. In order to suppress this power fluctuation issue, the FBG 2 can be packaged into another box with thermo electric cooler (TEC), or FBG 2 can be packaged into the same box as FBG 1 with TEC (FIG. 5).

Figure 6:
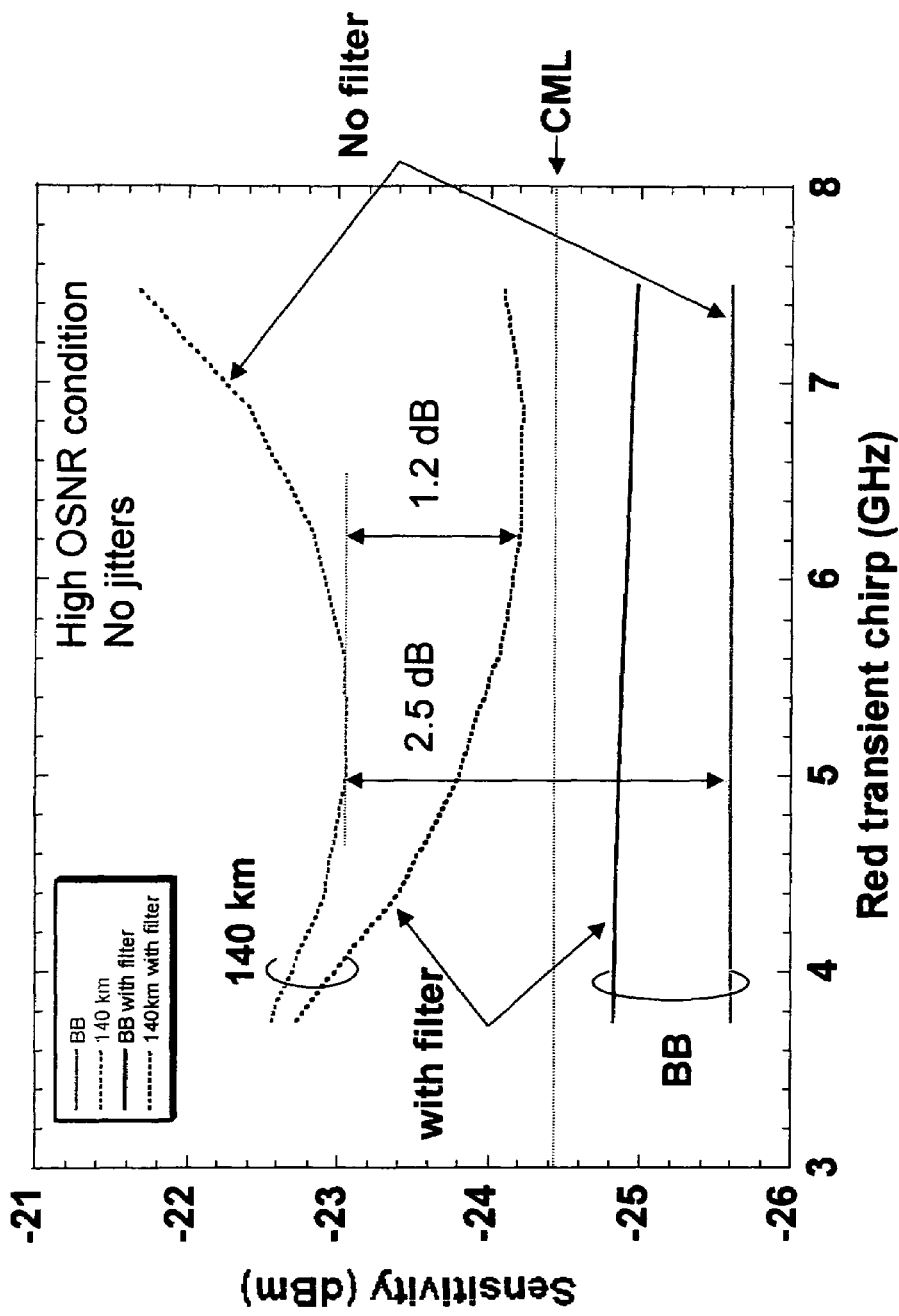
FIG. 6 plots sensitivity with respect to chirp for various transmitter configurations, including those in accordance with an embodiment of the present invention.

In another embodiment of the present invention the second optical filter is a band pass filter, which is nearly centered on the output spectrum of the ECL or other transmitter output spectrum. FIG. 6 shows the transmitter output (called back-to-back (BB)) and transmitted sensitivity after 140 km of standard fiber having 17 ps/nm/km fiber, shown as a function of negative transient chirp for an NRZ signal. FIG. 6 compares the case with and without the OBPF.

The OBPF used in this simulation is a 3-rd order Bessel filter with a 3-dB bandwidth of 14 GHz. It can be seen that the BB sensitivity degrades by 0.8 dB due to bandwidth limiting effect that reduces the eye opening (red curve for BB with filter). After transmission over 140 km, however, the sensitivity improves by use of filter by 1.2 dB (blue dotted curve) compared to the case where there is no filter (orange dotted curve). The bandwidth of OBPF is optimized to be 14 GHz in this case to set an example of the implementation. In practice, the optimum bandwidth can range from 10 GHz to 18 GHz depending on the rise/fall times of the external modulators used.

Figure 7:
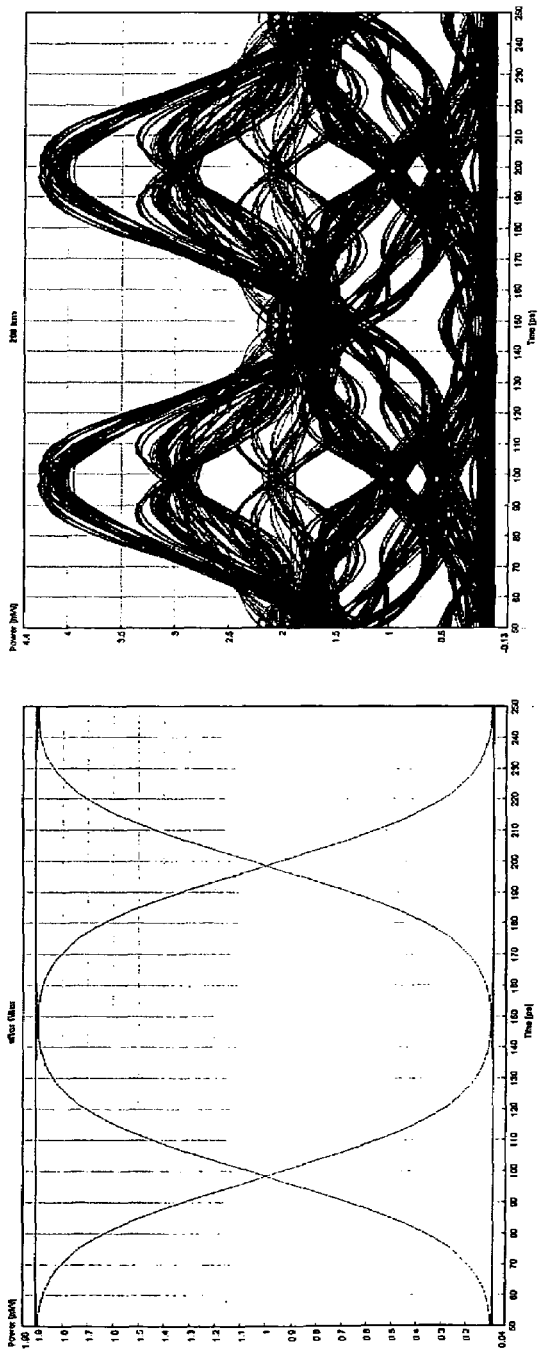
FIG. 7 illustrates eye diagrams for an optical transmitter without a filter in accordance with an embodiment of the present invention.

The improvement in sensitivity can be understood by observing the corresponding eye diagram shown in FIG. 7 on the right for the case without OBPF and FIG. 8 on the right for the case with OBPF. Without OBPF in FIG. 7, the eye after transmission closes since high frequency components contained in the modulated spectrum experiences large dispersion after transmission. This creates features in optical signal, which distorts the eye diagram. On the other hand, with OBPF in FIG. 8, the eye diagram shows an improved opening, resulting from the reduced high-frequency spectrum content in the modulated signal after the passage through the OBPF. The bandwidth limiting effect of spectrum is shown in FIG. 9 (a) before OBPF and (b) after OBPF. The −20 dB BW (ignoring the discrete carrier component) was reduced from 30 GHz to 17 GHz after OBPF with 3-dB BW of 14 GHz.

The improvement described above can be also understood in time domain by observing the chirp profile before and after the OBPF as shown in FIG. 10. The chirp profile before filter shows the typical transient chirp at the rising and falling edges. This components is in proportion to the time derivative of the intensity waveform. After the OBPF (FIG. 10 b), the intensity waveform shows slower rise/fall times which is approximates Gaussian pulse with a linear chirp across its profile. Such a linear chirp can be favorably compensated by the second order dispersion in the transmission fiber. This suppresses the ripples in the intensity waveform after transmission. It can be also seen that the intensity corresponding to the highest and lowest instantaneous frequency is reduced after OBPF. This is a result of bandwidth limiting effect by OBPF. The slight asymmetry in the intensity waveform in FIG. 10 (b) is a result of inherent dispersion of the OBPF.

In order to further look into the origin of improvement in sensitivity by way of OBPF, FIGS. 11 and 12 indicate the particular bit sequence that closes the eye. It can be seen that the bump in tail of 11 bit sequence is suppressed by OBPF, and leads to the observed improvement in sensitivity.

Figure 13:
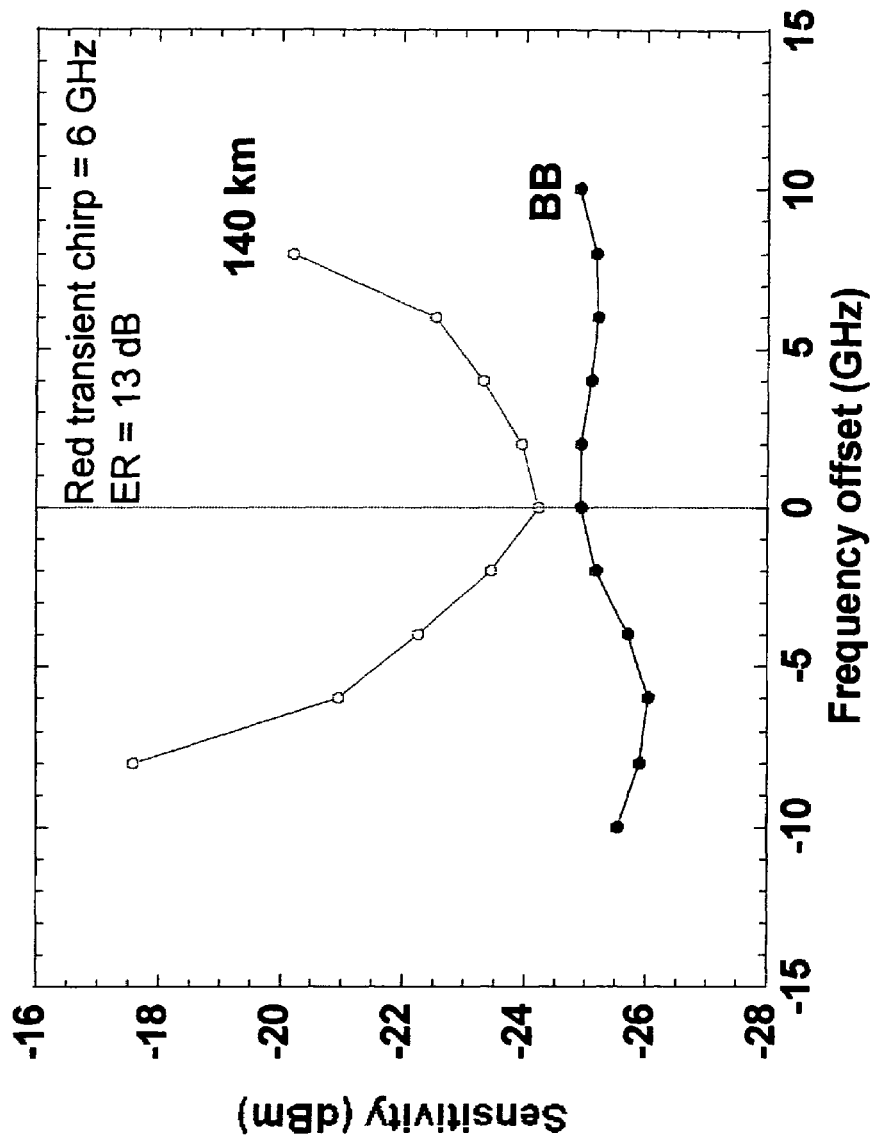
FIG. 13 plots sensitivity with respect to frequency offset between an optical signal and an optical band-pass filter in accordance with an embodiment of the present invention.

In FIG. 13, the effect of detuning the frequency between OBPF and center of the optical spectrum of the modulated signal is shown. The optimum detuning frequency is nearly zero as shown in the figure. Therefore, we can conclude that the improvement in sensitivity is ascribed to the bandwidth limiting effect rather than vestigial sideband effect in this embodiment of the present invention.

In FIG. 14, the effect of varying the duty cycle of the optical pulses is shown. The optimization in duty cycle further improves the performance after 140 km transmission by 0.7 dB in optical signal to noise ratio (OSNR). The improvement stems from the smaller bump in the zero right in the middle of decision timing and broader width for 11 bit sequence.

Figure 15:
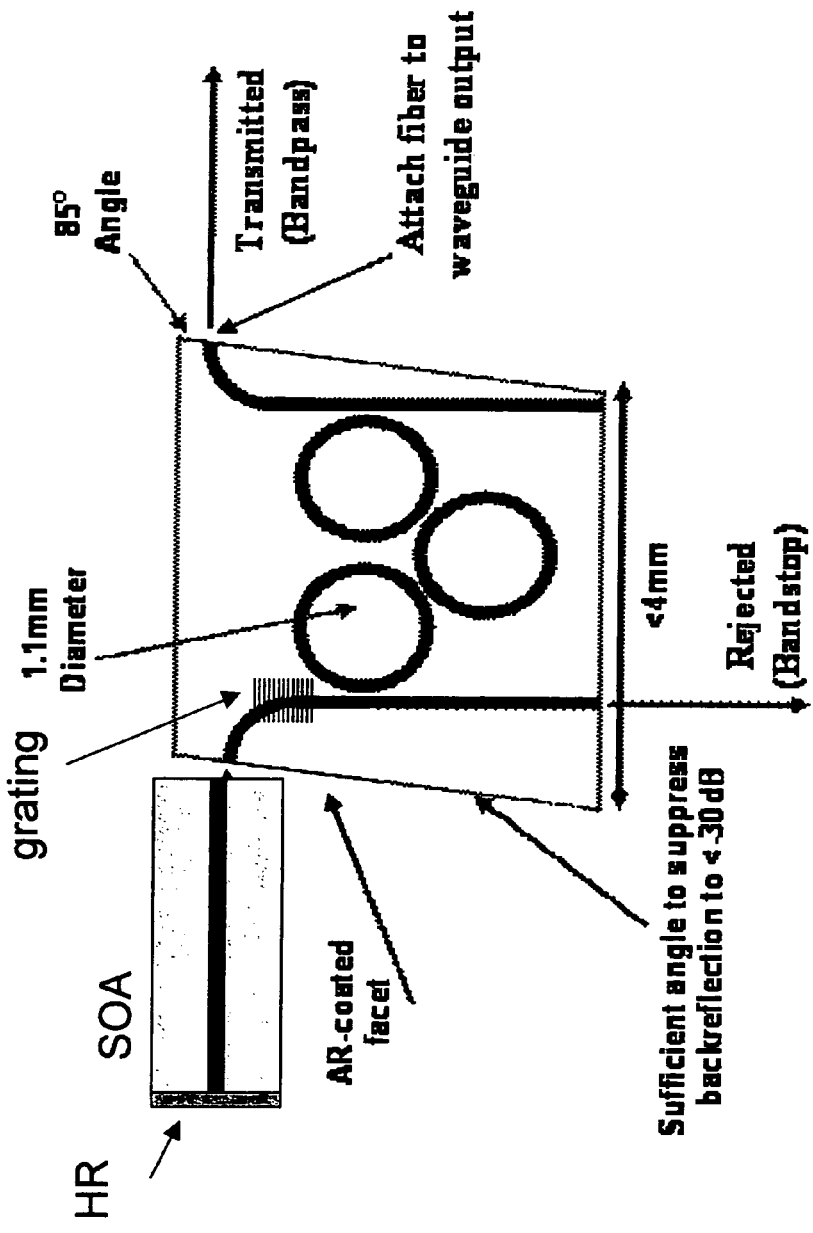
FIG. 15 illustrates an external cavity laser having a multi-resonator as an external mirror in accordance with an embodiment of the present invention.

FIG. 15 shows the preferred embodiment of optical transmitter, which comprises an external grating, SOA for gain section, and second grating for spectral filtering is shown.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A fiber optic system comprising a modulated signal source coupled to a spectral filtering element characterized in that a carrier frequency of a signal emitted from the modulated signal source is offset from a peak transmission frequency of the spectral filtering element by an amount about equal to one half of a full width half maximum bandwidth of the spectral filtering element.

2. A fiber optic system according to claim 1 wherein the modulated signal source is an external cavity laser.

3. A fiber optic system according to claim 2 wherein the external cavity laser comprises a semiconductor gain section and a grating section.

4. A fiber optic system according to claim 1 wherein the spectral filtering element is adapted so as to increase the rise time and the fall time of the amplitude profile of the modulated signal.

5. A fiber optic system according to claim 1 wherein the spectral filtering element is adapted so as to increase the propagation distance of the signal through dispersive fiber beyond the dispersion limit.

6. A fiber optic system comprising a modulated signal source adapted to emit a frequency modulated signal having a carrier frequency and two spectral sidebands, the frequency modulated signal source coupled to a spectral filtering element characterized in that the carrier frequency of a frequency modulated signal emitted from the modulated signal source is offset from a peak transmission frequency of the spectral filtering element by an amount effective to cause one of the two spectral sidebands to be substantially more attenuated than the other spectral sideband.

7. The fiber optic system of claim 6, wherein the carrier frequency is offset from the peak transmission frequency of the spectral filtering element by an amount about equal to one half of a full width half maximum bandwidth of the spectral filtering element.

* * * * *